Jan. 31, 1961
W. B. GILES
2,969,759
HYDRODYNAMIC DRAG REDUCTION IN VEHICLES
THROUGH BOUNDARY LAYER CONTROL
Filed Sept. 13, 1957
2 Sheets-Sheet 1
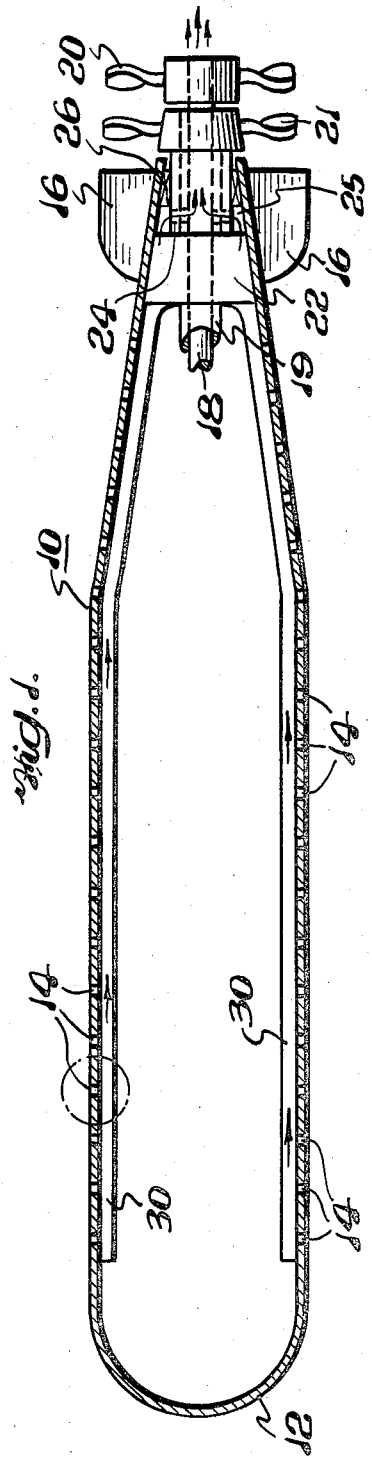
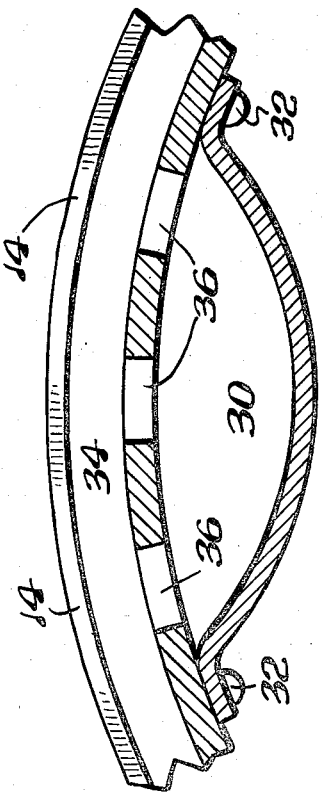
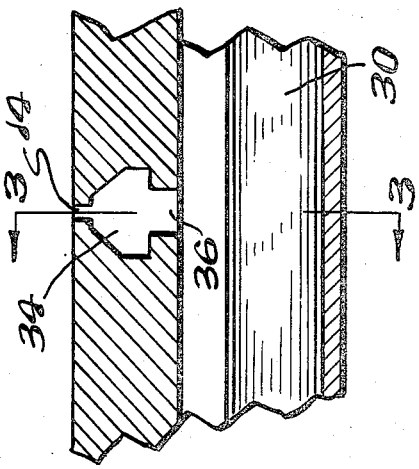
INVENTOR.
WALTER B. GILES
BY
Alfred B. Levine
ATTORNEY Jan. 31, 1961
W. B. GILES
2,969,759
HYDRODYNAMIC DRAG REDUCTION IN VEHICLES
THROUGH BOUNDARY LAYER CONTROL
Filed Sept. 13, 1957
2 Sheets-Sheet 2
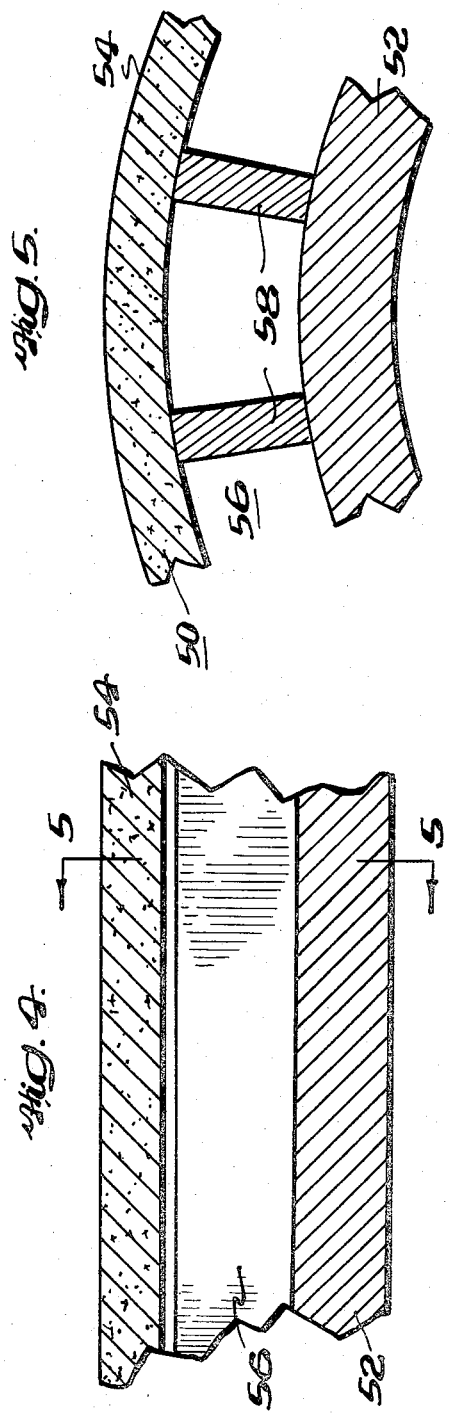
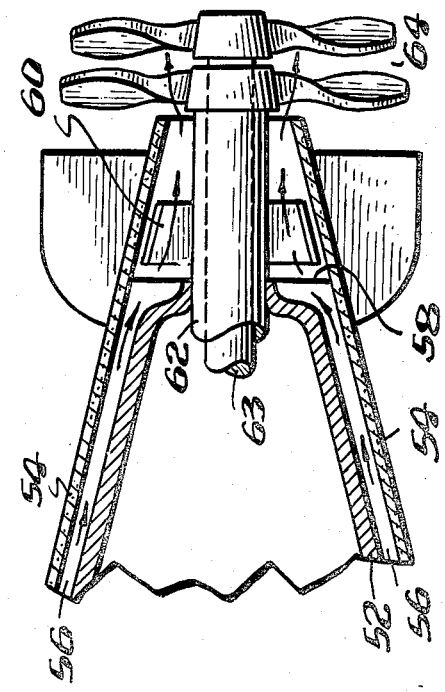
INVENTOR.
WALTER B. GILES
BY
*Alfred B. Levine*
ATTORNEY

United States Patent Office 2,969,759
Patented Jan. 31, 1961

2,969,759

HYDRODYNAMIC DRAG REDUCTION IN VEHICLES THROUGH BOUNDARY LAYER CONTROL

Walter B. Giles, Topsfield, Mass., assignor to General Electric Company, a corporation of New York Filed Sept. 13, 1957, Ser. No. 683,805

4 Claims. (Cl. 114—20)

The present invention relates to vehicles operative in fluid medium and more particularly to vehicles having substantially reduced hydrodynamic drag through boundary layer control.

It is well known that a major reduction in body drag in a fluid can be achieved through control of the boundary layer of the fluid next to the body. Body drag consists of two principal contributions, namely form drag or drag due to body shape, and skin friction or drag due to the friction between the body and the fluid through which it passes. A body which has poor form, such as a sphere, will show a tendency to have separation of the flow from the body and reversal of the flow direction in its wake, resulting in a high form drag. Hence, it can be seen that proper form design of the body will minimize form drag.

Boundary layer control through suction besides minimizing drag due to body shape has a secondary effect not shared with other methods using smooth body surfaces and suitably shaping of the body. Control of the boundary layer through suction will also result in a reduction of the skin friction drag. This skin friction drag is caused by the sheer stresses set up in the fluid as it passes over the body. Considering the fluid flow to be in infinitesimal thickness layers in the laminar portion of the flow, layers nearest the body are slowed by viscous contact with the body surface. This slowing is transferred with decreasing effect to successive layers outward from the body by viscous coupling and a shear force is set up through the layers of different velocity to cause the skin friction drag. As the slowing of the layers nearest the skin continues, these layers become unstable, so that the laminar pattern is broken up and the boundary layer becomes turbulent.

This turbulent boundary layer contains much higher shear forces than the laminar boundary layer, consequently the skin friction drag of a turbulent boundary layer is much greater. If the flow which is next to the body and is slowing to a near unstable condition is removed by suction through the skin of the body, the flow may be stabilized and held laminar over the full length of the body. However, for drag reduction only small amounts of fluids should be removed from the boundary layer; if the boundary layer becomes very thin the resulting high velocity gradients will produce an increase in drag.

Hence, present methods of reducing hydrodynamic drag on surface and underwater vehicles include the use of smooth surfaces to minimize turbulent drag associated with the operation of a structure in a fluid medium and in addition the use of suitable vehicle configuration to control and reduce the drag loads on the vehicle. Other methods attempt to utilize a favorable pressure gradient on the nose of a vehicle, for example a torpedo body, to stabilize the boundary layer and delay the onset of turbulence in the flow over the body. These methods operate to reduce the drag due to body shape so as to delay the separation of flow from the body or to minimize turbulence to skin friction drag or to delay the onset of turbulence by the use of a favorable pressure gradient. However, such methods have specific structural or hydrodynamic limitations which prohibit their optimum utilization for substantial hydrodynamic drag reduction in surface and underwater vehicles.

The present invention comprises the application of boundary layer control techniques to the drag reduction of surface and underwater vehicles, such as torpedoes, submarine, sea plane landing gear, hydrofoil ship hulls, and the like. More specifically, the present invention discloses the use of suction to delay the onset of turbulent flow in the boundary layer of such a vehicle and hence, result in a significant reduction of the skin friction drag. However, other boundary layer control techniques are envisioned such as inducing turbulence by blowing to prevent separation of the flow from the vehicle to minimize drag due to body shape; or the use of suction to delay separation, which can result in a reduction of profile drag which is a function of the shape of the body.

In addition, the present invention, in its application to such vehicles as submarines, surface ships, and the like, may be provided with back flushing operatively associated with the surface of the vehicle to forestall the adhesion of barnacles. In this manner, the vehicle maintains a clear surface for more efficient operation in the fluid medium with respect to body drag, besides maintaining a clear surface for uninterrupted application of the suction boundary layer control technique.

Other applications and modifications in the technique of the present invention are contemplated, for example, utilization of boundary layer control in depth charges, sea-to-air missile launchings, and directional control of torpedoes. With respect to the application to provide directional control of submerged vehicles, the fins of torpedoes, for example, normally generate an appreciable amount of drag. A portion of the aft section of the torpedo can be separated into approximately four compartments with separate and controllable suction sinks so that for directional control high suction rates over one compartment would insure laminar, low-drag flow thereon, while the opposite section would have a low suction rate resulting in turbulent, high-drag flow eliminating the need for fins. Thus under constant directional operation the drag of the fins are entirely eliminated.

In the present invention, area suction is utilized to prevent turbulence in the boundary layer by drawing in from the boundary layer through the skin of the vehicle small amounts of fluid. The skin of the vehicle may be formed of porous material or a multitude of slots or perforations which will supply the suction flow to modify the velocity distribution of the boundary layer and control the boundary layer thickness to increase its stability and delay the onset of turbulent flow to materially reduce the skin friction drag.

The present invention discloses a submerged vehicle, for purposes of illustrating the techniques of the present invention, which is formed from a porous or perforated skin and is supplied with a mechanized means for developing the suction flow, and, if desired, means for back-washing the porous material or for maintaining the perforations in operative form. The required suction pressure is quite low so that it may be possible to use pressure differential existing between the skin of the vehicle and the low pressure cavity at the aft section of the vehicle.

Another method of suitably controlling the boundary-layer would be to bring in fluid from the nose of the vehicle and pass this fluid through the underside of the porous skin material and induce suction flow by such aspiration action. This approach to the solution of boundary layer control would be particularly advantageous if the vehicle is propelled by ram principle. The present invention also includes the addition of suitable pumping means, such as a constant displacement or centrifugal pump, or the incorporation of a centrifugal pump in the propeller screws for developing the suction pressure where aspiration action is not applicable.

The application of the present invention to control the boundary layer of a surface or submerged vehicle will appreciably reduce the form drag of the vehicle by preventing separation as caused by adverse pressure gradients which induces a reverse flow in the boundary layer resulting in the main flow separating from the body surface. Hence, the application of the present invention will result in lower form drags for existing vehicle shapes or configuration and make possible the utilization of short and thick torpedoes and submarines and allow for higher angle of attack and wing loading on hydrofoils associated therewith. It will be obvious, of course, that variable speed systems can be provided by having variable suction rates for optimum operation which will not require additional components but merely careful design as to the skin or surface of the vehicle.

An object of the present invention is the provision of a vehicle operative in fluid medium having substantially reduced hydrodynamic drag through boundary layer control over the surface of the vehicle.

Another object is to provide a means of applying boundary layer control techniques for reducing the drag of surface and underwater vehicles by delaying the onset of turbulent flow in the boundary layer of the vehicle.

A further object of the invention is the provision of a boundary layer control technique for surface and underwater vehicles whereby suction is utilized to prevent turbulence in the boundary layer by drawing in small amounts of fluid through the skin of the vehicle to modify the shape of the velocity distribution in the boundary layer and to reduce the boundary layer thickness.

Another further object is to provide a surface or underwater vehicle having mechanical means for developing a suction flow for modifying the shape of the boundary layer and improving the drag characteristics of the vehicle.

A still further object of the present invention is the provision of a boundary layer control technique for reducing the drag on surface and underwater vehicles by utilizing suction to delay the onset of turbulent flow in the boundary layer to substantially reduce the skin friction drag of the vehicle.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1 is a side view, substantially in section, of a preferred embodiment of the invention illustrating a torpedo constructed in accordance with the principles of the present invention;

Figure 2 is a sectional view, exaggerated for purposes of illustration, of one of the suction slits provided on the hull of the torpedo of Figure 1;

Figure 3 is a sectional view, taken on a line 3—3 of Figure 2 looking in the direction of the arrows, showing the relationship of the suction slits with the longitudinal ducts;

Figure 4 is a sectional view taken along the longitudinal axis of the torpedo of Figure 1, illustrating a modification of the hull construction wherein a porous skin surface is utilized;

Figure 5 is a sectional view, taken on a line 5—5, of Figure 4 looking in the direction of the arrows, illustrating the use of longitudinal stringers between the porous surface and the inner pressure hull; and Figure 6 is a sectional view of the torpedo of Figure 1, modified in accordance with the disclosure of Figure 4, and illustrating the integral use of an axial flow pump with the propeller driving means.

Referring now to the drawings, there is illustrated a preferred embodiment 10 comprising a torpedo pressure hull 12 of suitable configuration for hydrodynamic efficiency, and provided over a substantial portion of the fore and aft sections with a plurality of suction slits 14. The pressure hull 12 is provided with suitable stabilizers and controls 16 secured to the hull in a conventional manner and which do not form a part of the invention herein disclosed. Only a portion of the propelling means are illustrated to merely show the relative coaction between the salient members of the present invention. For example, a portion of a pair of hollow and concentric torpedo power shafts 18 and 19 are shown axially located with respect to the pressure hull 12, and extending through the stern of the torpedo.

Counter rotating propellers 20 and 21 are operatively fixed to the end of the hollow power shafts 18 and 19, respectively, in such manner as to not interfere with any possible flow of fluid through the shafts. A pump, such as an axial flow pump 22, or the like, is provided at the aft portion of the torpedo operatively coupled to the concentric power shaft 19 and driven thereby. The pump 22 is operatively coupled to the interior of the shaft 18 through a number of fluid commutators 24 and cooperating cylindrical exhaust chamber 25 concentrically positioned with respect to the power shafts 18 and 19, to provide a conduit from the axial flow pump 22 to the stern end of the torpedo. Conventional bearings 26 are also provided for suitably journalling the concentric power shafts 18 and 19 at the stern of the torpedo.

Flow ducts 30 are provided on the interior surface of the pressure hull 12 to provide flow removal means on the interior of the pressure hull to allow for the removal of fluid from the boundary layer to the axial flow pump 22 exhausting through the power shaft 18 into the torpedo wake. The ducts 30 may be a continuous single member concentric with the pressure hull or, as shown in Figure 3, may be individual ducts circumferentially spaced about the interior surface of the hull 12 and suitably secured thereto by conventional securing means, such as rivets 32, or the like.

The suction slits 14, as seen from Figure 2, are normal to the flow over the pressure hull so as to increase the stability of the boundary layer on the pressure hull. Each one of the parallel and longitudinally spaced radial slits is provided with a circumferential collecting chamber 34 integral therewith and axially spaced from each other. Each collecting chamber is operatively coupled to the coacting ducts 30 by a plurality of exit apertures 36 suitably spaced about the interior surface of the hull 12 to facilitate removal of suction flow to the ducts while still maintaining the structural rigidity of the hull. If desired, the pressure hull may be fabricated section by section, so that the projection of one axial section fits a corresponding depression in the adjacent axial section and joined by welding, riveting, or other similar means. Similarly, the ducts 30 may be added section by section and joined to the interior surface of the pressure hull by rivets, bolts, welding, or the like, so that the outer surface of the pressure hull will be free of protrusions. Further, the pressure hull assembly may be finished machined or the suction slits 14 may be machined in the final operation if so desired, however, it can be seen that various machining means may be adopted for use with the preferred embodiment 10.

In the operation of the preferred embodiment 10, fluid enters through the suction slits 14 to the collecting chamber 34 and through the exit apertures 36 to the ducting 30. The longitudinal duct 30 conveys the sea water to the axial flow pump 22 which passes the suction flow through the exhaust chamber 25 and the commutators 24 to the interior of the hollow power shaft 18 and, finally, into the torpedo wake. In this manner, area suction or the uniform removal of boundary layer fluid acts to reduce the thickness of the boundary layer and delay the onset of turbulent flow in the boundary layer of the torpedo and significantly reduce the skin friction drag associated therewith.

In brief, the suction flow enters through the slits 14 into the integral collecting chambers 34 and through the apertures 36 opening into the longitudinal ducts 30. The ducts transport the fluid through the axial flow pumps and out through the operatively associated exhaust chambers and commutators to the torpedo wake. As can be seen from Figure 1, the low pressure high flow axial pump is driven by the outer power shaft 19. The flow is commuted into the center of the shaft 18 and then forced out through the stern end of the power shaft into the torpedo wake. In this manner, the pump 22 is connected to a low pressure point which may be considered to aid the pump or to decrease the profile drag of the preferred embodiment 10.

Figures 4, 5 and 6 illustrate a modification 50 of the preferred embodiment 10, wherein a pressure hull 52 is utilized having a concentric porous covering or shell 54 radially spaced therefrom by a plurality of circumferentially spaced longitudinal bulkheads 56 forming a series of longitudinal duct passages 58. The longitudinal bulkheads or stringers 56 are suitably fixed to the inner pressure hull 52, while the porous shell 54 is secured such as by spot welding, or the like, to the stringers 56 to form an integral sandwich construction hull.

The stringers 56 may be placed on a slight longitudinal spiral, so that the loss of porosity need not exist along a longitudinal line and suction flow will exist right behind a weld so as to prevent local transition. In this manner, the stringers 56 may be closely spaced circumferentially to form a rigid assembly. The porous shell 54 may be composed of sintered stainless steel, sintered wire mesh, perforated metal sheet, or of some other suitable porous material. Also, variable suction can be obtained by using a variable porosity material. For simplicity, the skin can consist of two surfaces of discrete porosity differences.

The aft portion of the preferred embodiment 50 is provided, for example, with a low head, high capacity pump 60 operatively coupled to an outer power shaft 62 which is operatively associated with a concentric power shaft 63. The pump is directly coupled to the duct passages 58 to transport the suction flow from the stern of the torpedo into the path of counter-rotating propellers 64 and, in turn, into the torpedo wake.

Briefly, the modification 50 comprises a porous covering 54 radially spaced from the inner pressure hull 52 by duct stringers 56 and passages 58. The thin porous shell 54 will, of course, increase handling problems, but closely spaced bulkheads 56 will provide sufficient skin stability. For example, porous stainless steels have been fabricated with tensile strengths of fifty thousand p.s.i. and up. Also, is will be obvious that a perforated skin structure may be utilized for the porous shell 54, or such other materials as woven steel fiber or sintered metals which are commercially available.

The ducting passages 58 will increase the overall hull diameter, but this increase is not significant except in the aft section of the torpedo. However, it can be shown that the duct passages 58 may be sufficiently reduced since the "dead water" associated wtih torpedoes, defined as low pressure cavity in their wake due to separation of the wake, will provide sufficient pressure differential to assist the pump 60 to maintain a suitable predetermined suction flow. However, various modifications, such as the addition of a plurality of pumps, and the like, may be utilized to achieve suitable suction flow for a particular installation. In the modification 50, the pump 60 comprises a plurality of vanes of suitable design for the particular suction flow required and conventionally secured to the outer power shaft 62 to serve as an axial flow pump to provide the required pumping in the system.

As seen in Figure 6, the suction flow through the porous shell 54 is exhausted into the region directly behind the torpedo body, and the discontinuity between the torpedo body and the propeller hub is allowable since the suction flow fills the otherwise void region associated therewith. In this manner, the present invention applies boundary layer control, through the generation of a suction flow to stabilize the boundary layer and hence reduce skin friction, to underwater and surface vehicles, such as the torpedo herein disclosed. The utilization of the present invention for long range systems, may result in clogging the porous material and require some sort of back washing procedure. The use of back washing will of course provide a temporary loss in efficiency, however, this would not be an appreciable disadvantage since this clogging condition would not occur often. In operation, a reverse pressure of the same magnitude as the suction pressure is normally sufficient for successful back washing. This back wash technique would modify the present invention only to the extent of including conventional valves for reversing the inlet and outlet of the pumps 22 and 60 and would, of course, depend on the particular application and suction techniques utilized.

In conclusion, the present invention offers net shaft horsepower reductions in excess of 50% without imposing any apparent design limitations in such surface or underwater vehicles as the torpedoes herein disclosed. This can be seen from the following illustrative example, wherein calculations for uniform values of suction at the theoretical maximum suction required have been made for a 21 inch diameter, 246 inch length torpedo body where suction is not necessary to reduce form drag associated therewith. Normally, such a body would require approximately 300 shaft horsepower to achieve 45 knots velocity. Incorporating the principles of the present invention, the theoretical shaft horsepower required to achieve 45 knots would be approximately 125.

The idealized suction would require the pumping of approximately 400 gallons of fluid per minute at a low head with the power required estimated to be on the order of 15 horsepower. Consequently, this would indicate a total horsepower requirement of 140 shaft horsepower, resulting in a reduction of 160 horsepower from the normally required 300 horsepower. The present invention achieves this gain by reducing the skin friction drag associated with the torpedo by a factor of almost nine. Also, the volume of fluid which must be theoretically removed to stabilize the boundary layer over the torpedo body will vary with the length along the body. Idealization of the suction requirements of this particular illustrative example, would give some additional reduction of the power required due to the lower volume of fluid to be pumped.

Hence, for this particular torpedo body, use of boundary layer control would allow the 300 horsepower propulsion plant to propell the torpedo at approximately 60 knots instead of the 45 knots without boundary layer control, and use of the 140 horsepower propulsion plant would approximately double the running range for the same amount of fuel or battery weight. Accordingly, it can be seen that the gains achieved through boundary layer control through suction flow may be used to provide either increased speed or increased range of surface or underwater vehicles and thus, provides a major advance in the hydrodynamic field of technical endeavor.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention as set forth in the appended claims on the following pages.

What is claimed is:

1. Boundary layer control means for reducing the drag of surface and underwater vehicles, comprising a plurality of slit means integral with the surface of the vehicle to permit a suction flow therethrough, duct means operatively associated with said slit means for carrying the suction flow to the stern of the vehicle, pump means operatively coupled to said duct means for generating and maintaining the suction flow and for preventing any hinderance to the suction flow at the surface of the vehicle, and means for reversing said suction flow.

2. Boundary layer control means for a submerged vehicle, comprising a porous surface substantially covering the vehicle, mechanical means for developing a suction flow through said porous surface to appreciably reduce the vehicle's form drag by preventing flow separation, and means for backwashing the porous surface for maintaining a continuous suction flow therethrough.

3. A self-propelled underwater vehicle operative in a fluid medium having a pressure hull, a plurality of suction slits perpendicular to the longitudinal axis of the vehicle and covering a substantial portion of the fore and aft section of said hull, pump means actuated by the vehicle's power source for inducing a suction flow through said suction slits, fluid commutator means coupling said pump means with the stern of the vehicle for exhausting said suction flow therethrough.

4. Boundary layer control means for a self-propelled underwater vehicle, comprising a pressure hull having a concentric porous covering spaced therefrom by a plurality of circumferentially spaced longitudinal bulkheads, each adjacent pairs of bulkheads forming a longitudinal duct, each longitudinal duct having a slight longitudinal spiral to maintain a constant porosity over said porous covering, a pump operatively coupled to all of said ducts for inducing suction flow therethrough from said porous covering to the stern of the vehicle to stabilize its boundary layer and hence reduce skin friction thereover.

References Cited in the file of this patent

UNITED STATES PATENTS

| | | |
|---|---|---|
| 1,859,139 | Hanlon | May 17, 1932 |
| 2,261,558 | Orloff | Nov. 4, 1941 |
| 2,561,303 | Whittle | July 17, 1951 |
| 2,742,247 | Lachmann | Apr. 17, 1956 |
| 2,764,954 | Oeltgen | Oct. 2, 1956 |

FOREIGN PATENTS

| | | |
|---|---|---|
| 825,134 | France | Nov. 27, 1937 |
| 717,416 | Great Britain | Oct. 27, 1954 |